United States Patent
Kim et al.

(10) Patent No.: US 9,950,429 B2
(45) Date of Patent: Apr. 24, 2018

(54) ROBOT CLEANING SYSTEM AND METHOD OF CONTROLLING ROBOT CLEANER

(71) Applicant: LG ELECTRONICS INC., Seoul (KR)

(72) Inventors: Younggie Kim, Seoul (KR); Sangyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 14/812,816

(22) Filed: Jul. 29, 2015

(65) Prior Publication Data

US 2016/0052133 A1  Feb. 25, 2016

(30) Foreign Application Priority Data

Jul. 30, 2014 (KR) .................. 10-2014-0097317

(51) Int. Cl.
  *G05B 19/18* (2006.01)
  *B25J 9/16* (2006.01)
  (Continued)

(52) U.S. Cl.
  CPC .......... *B25J 9/1664* (2013.01); *A47L 9/2805* (2013.01); *A47L 9/2852* (2013.01); *A47L 11/4011* (2013.01); *B25J 9/1692* (2013.01); *B25J 9/1697* (2013.01); *B25J 11/0085* (2013.01); *B25J 13/003* (2013.01); *B25J 13/006* (2013.01); *B25J 13/084* (2013.01); *G05D 1/0016* (2013.01); *G05D 1/0033* (2013.01);
  (Continued)

(58) Field of Classification Search
  CPC ...... B25J 9/1664; B25J 9/1692; B25J 9/1697; A47L 9/2805; A47L 9/2852; A47L 11/4011
  See application file for complete search history.

(56) References Cited

U.S. PATENT DOCUMENTS

2007/0081695 A1* 4/2007 Foxlin ................ G06T 7/73
  382/103
2007/0150097 A1* 6/2007 Chae ................ G05D 1/0234
  700/245
(Continued)

FOREIGN PATENT DOCUMENTS

EP  2725443 A2  4/2014
GB  2369511 A  5/2002
(Continued)

*Primary Examiner* — Ian Jen
(74) *Attorney, Agent, or Firm* — Dentons US LLP (57) ABSTRACT

Disclosed is a method of controlling a robot cleaner. The control method includes acquiring an image of the robot cleaner and a surrounding area of the robot cleaner at a reference position, the robot cleaner having two markers spaced apart from each other by a given distance, extracting the two markers from the acquired image, defining a horizontal plane of an actual space in which the two markers are located, based on positions of the two markers displayed on the acquired image and an actual distance between the two markers, acquiring position information of the robot cleaner relative to the reference position, based on position information of the two markers in the horizontal plane, and controlling travel of the robot cleaner based on the position information of the robot cleaner relative to the reference position.

12 Claims, 10 Drawing Sheets

(51) Int. Cl.
*A47L 9/28* (2006.01)
*A47L 11/40* (2006.01)
*B25J 11/00* (2006.01)
*B25J 13/00* (2006.01)
*B25J 13/08* (2006.01)
*G05D 1/00* (2006.01)

(52) U.S. Cl.
CPC .. *A47L 2201/04* (2013.01); *G05D 2201/0203* (2013.01); *Y10S 901/01* (2013.01)

(56) References Cited

U.S. PATENT DOCUMENTS

| | | | | |
|---|---|---|---|---|
| 2007/0234492 | A1* | 10/2007 | Svendsen | A47L 5/30 15/21.1 |
| 2008/0287924 | A1* | 11/2008 | Mangiardi | A47L 11/302 606/1 |
| 2009/0312871 | A1* | 12/2009 | Lee | G01C 21/00 700/259 |
| 2010/0135572 | A1* | 6/2010 | Kim | G06K 9/00348 382/153 |
| 2011/0037712 | A1* | 2/2011 | Kim | H04M 1/7253 345/173 |
| 2011/0098923 | A1 | 4/2011 | Lee | |
| 2011/0146676 | A1* | 6/2011 | Dallam | A61B 90/35 128/203.12 |
| 2012/0125363 | A1* | 5/2012 | Kim | A47L 9/28 134/6 |
| 2013/0223679 | A1* | 8/2013 | Russ | G06T 7/004 382/103 |
| 2013/0326839 | A1* | 12/2013 | Cho | A47L 9/2805 15/319 |
| 2014/0009748 | A1* | 1/2014 | Leonessa | G01C 3/08 356/4.03 |
| 2014/0116469 | A1* | 5/2014 | Kim | A47L 9/2894 134/18 |
| 2014/0167931 | A1* | 6/2014 | Lee | G08C 17/02 340/12.5 |
| 2015/0115876 | A1* | 4/2015 | Noh | H02J 7/0042 320/107 |

FOREIGN PATENT DOCUMENTS

| | | |
|---|---|---|
| JP | 2009-276166 A | 11/2009 |
| KR | 10-0483548 B1 | 4/2005 |
| KR | 10-0749923 B1 | 8/2007 |

* cited by examiner

ROBOT CLEANING SYSTEM AND METHOD OF CONTROLLING ROBOT CLEANER

CROSS-REFERENCE TO RELATED APPLICATION

This application claims the priority benefit of Korean Patent Applications No. 10-2014-0097317, filed on Jul. 30, 2014, in the Korean Intellectual Property Office, the disclosures of which are incorporated herein by reference.

BACKGROUND OF THE INVENTION

1. Field of the Invention

The present invention relates to a robot cleaning system and a method of controlling a robot cleaner that constitutes the robot cleaning system.

2. Description of the Related Art

Conventionally, a robot cleaner is an appliance that automatically performs cleaning by suctioning dust and other dirt from the floor while autonomously traveling about a zone to be cleaned without user operation.

There are known various simultaneous localization and mapping (SLAM) methods of recognizing a position of a robot cleaner using an ultrasonic sensor, a vision sensor or the like and generating a map in a robot cleaner technology field.

However, conventional SLAM serves to generate a map of a surrounding area of a robot cleaner and has no ability to grasp a positional relationship between a user and a robot cleaner, thus having difficulty in providing user centered services.

In addition, there is a limit to provide service based on attitude of a robot cleaner because of absence of technologies to grasp attitude of a robot cleaner.

SUMMARY OF THE INVENTION

Therefore, the present invention has been made in view of the above problems, and it is one object of the present invention to provide a robot cleaning system in which position of a robot cleaner may be acquired via a screen displayed on a mobile terminal, and a method of controlling a robot cleaner.

It is another object of the present invention to provide a robot cleaning system in which position of a robot cleaner may be displayed based on a coordinate system centered on a mobile terminal, and a method of controlling a robot cleaner.

It is another object of the present invention to provide a robot cleaning system in which position and attitude of a robot cleaner may be calculated using a reduced number of markers, i.e. two markers provided at the robot cleaner via utilization of attitude information of a mobile terminal that is detectable by an inertial sensor included in the mobile terminal, and a method of controlling a robot cleaner.

It is a further object of the present invention to provide a robot cleaning system in which a control mode for cleaning of a user defined zone, a control mode for user tracking of a robot cleaner and various other control modes may be accomplished via a screen displayed on a mobile terminal, and a method of controlling a robot cleaner.

In accordance with one embodiment of the present invention, the above and other objects can be accomplished by the provision of a method of controlling a robot cleaner having two markers spaced apart from each other by a known distance, the method comprising acquiring an image, from a reference position, of the robot cleaner and a surrounding area of the robot cleaner, identifying the two markers in the acquired image, defining a horizontal plane in space in which the two markers are actually located, based on positions of the two markers displayed on the acquired image and the known distance, determining the position of the robot cleaner relative to the reference position, based on a projected position of the two displayed markers on the horizontal plane and controlling travel of the robot cleaner based on the determined position of the robot cleaner relative to the reference position.

The defining may include determining the horizontal plane by substituting the known distance into an equation for the distance between points where a first line and a second line, respectively connecting the two displayed markers and the reference position, intersect the horizontal plane.

The position of the robot cleaner may be defined based on a coordinate system centered on the reference position.

The controlling may include setting an area in the acquired image and projecting the area onto the horizontal plane and instructing the robot cleaner to travel in the projected area.

The controlling may include setting a path in the acquired image and projecting the path onto the horizontal plane and instructing the robot cleaner to travel along the path projected onto the horizontal plane.

The controlling may include instructing the robot cleaner to move toward the reference position from the determined position of the robot cleaner.

The controlling may include defining a line in the acquired image and projecting the line onto the horizontal plane and instructing the robot cleaner not to pass the line projected onto the horizontal plane.

The method may further comprise stopping movement of the robot cleaner when a predetermined touch input is applied to a display unit displaying the acquired image.

The controlling includes receiving a voice command to control travel of the robot cleaner.

In accordance with another embodiment of the present invention, there is provided a robot cleaning system including a robot cleaner having two markers spaced apart from each other by a known distance and a mobile terminal configured to: acquire an image, from a reference position, of the robot cleaner and a surrounding area of the robot cleaner, identify the two markers in the acquired image, define a horizontal plane in space in which the two markers are actually located, based on positions of the two markers displayed in the acquired image and the known distance, determine the position of the robot cleaner relative to the reference position where the image is acquired, based on a projected position of the two displayed markers on the horizontal plane and control travel of the robot cleaner based on the determined position of the robot cleaner.

The mobile terminal may be configured to control travel of the robot cleaner via wireless communication.

The mobile terminal may include a touchscreen configured to display the acquired image and a controller configured to control travel of the robot cleaner via wireless communication according to a touch input on the touchscreen.

The touch input to the touchscreen may define an area of the horizontal plane.

The touch input to the touchscreen may define a line on the horizontal plane.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The advantages and features of the present invention and the way of attaining them will become apparent with reference to embodiments described below in detail in conjunction with the accompanying drawings. The present invention, however, may be embodied in many different forms and should not be constructed as being limited to the embodiments set forth herein. Rather, these embodiments are provided so that this disclosure will be through and complete and will fully convey the scope to those skilled in the art. The scope of the present invention should be defined by the claims. Wherever possible, the same reference numbers will be used throughout the drawings to refer to the same or like parts.

Figure 1A:
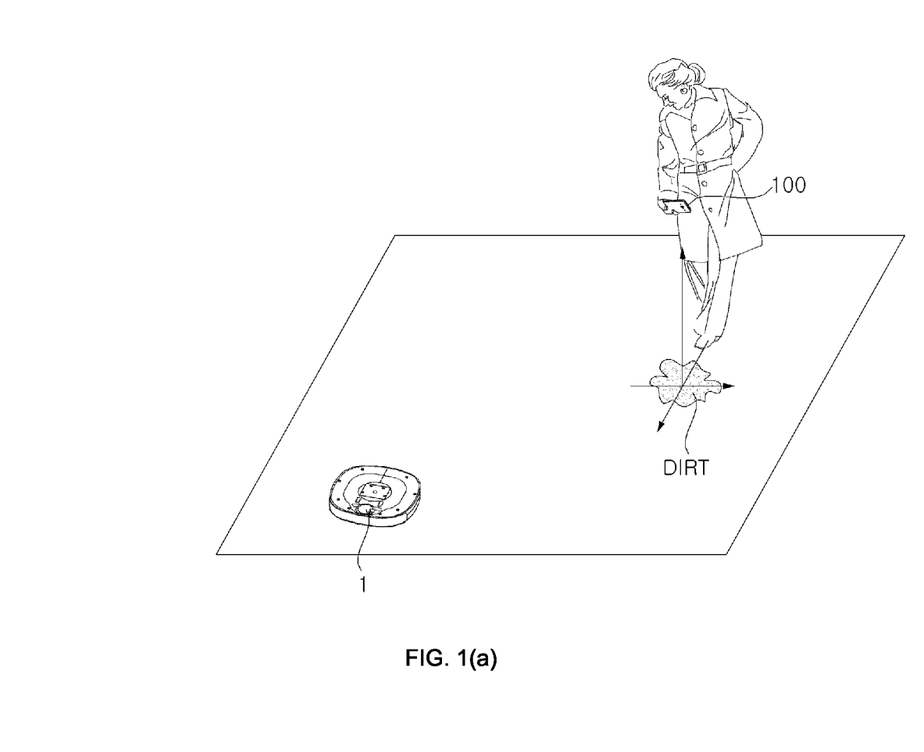
FIG. 1(a) is a view showing an application example of a robot cleaning system according to one embodiment of the present invention and FIG. 1(b) is a view showing a screen of a mobile terminal.
Figure 1B:
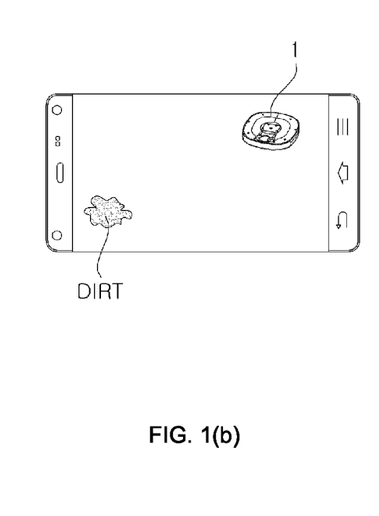
Figure 2:
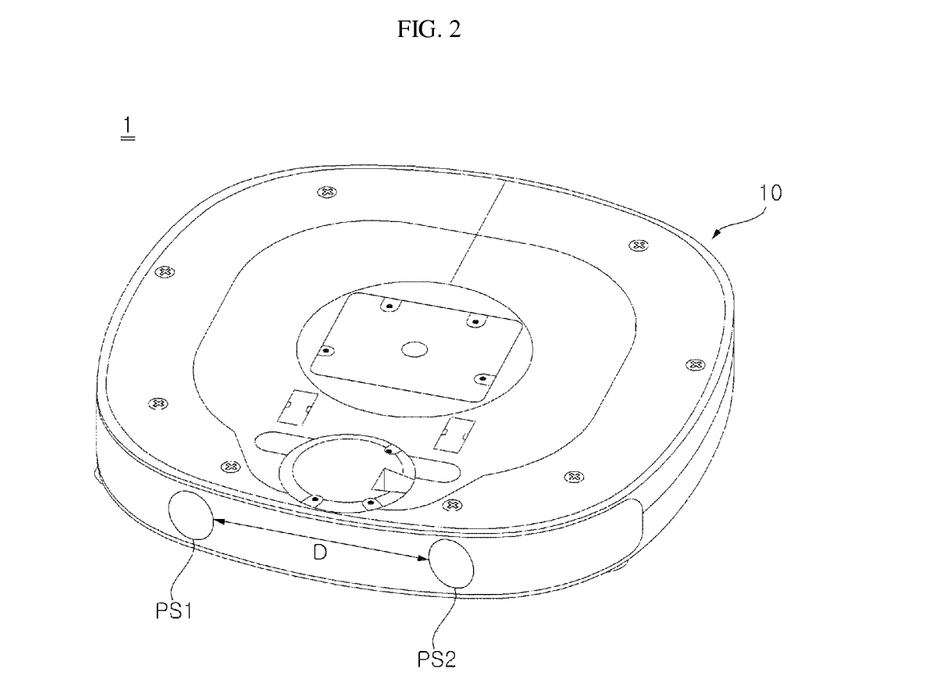
FIG. 2 is a perspective view showing a robot cleaner according to one embodiment of the present invention.
Figure 3:
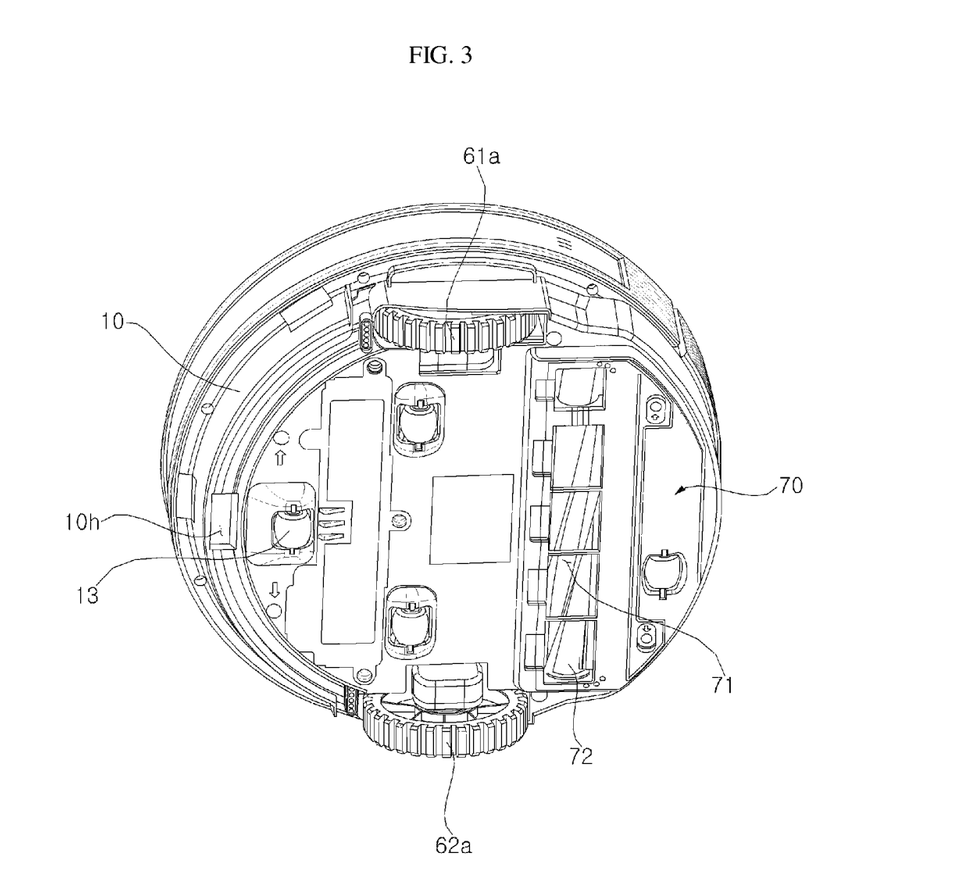
FIG. 3 is a view showing the bottom of the robot cleaner shown in FIG. 2.
Figure 4:
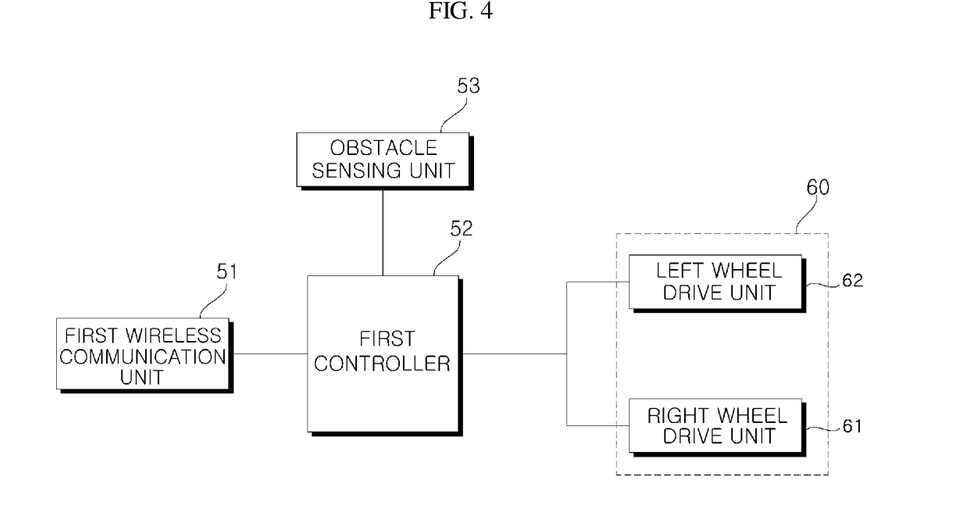
FIG. 4 is a block diagram showing a control relationship between major components of a robot cleaner.
Figure 5:
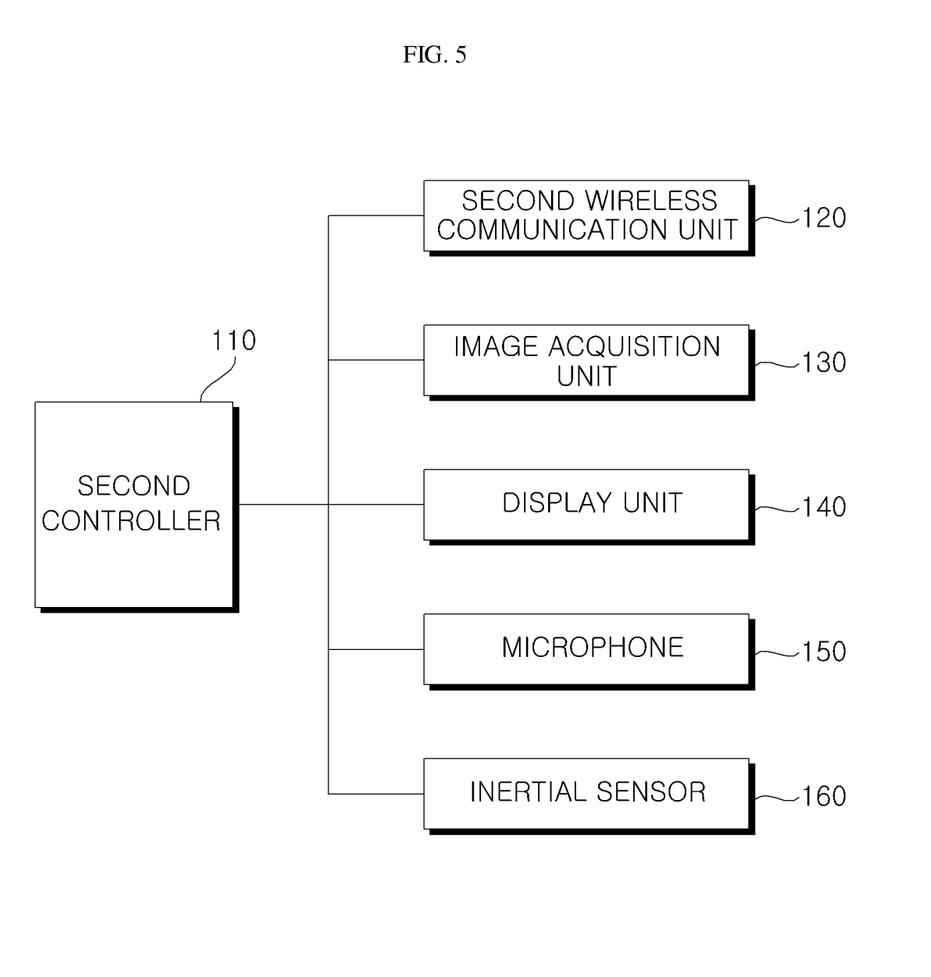
FIG. 5 is a block diagram showing a control relationship between major components of a mobile terminal.

FIG. 1(a) is a view showing an application example of a robot cleaning system according to one embodiment of the present invention and FIG. 1(b) is a view showing a screen of a mobile terminal. FIG. 2 is a perspective view showing a robot cleaner according to one embodiment of the present invention. FIG. 3 is a view showing the bottom of the robot cleaner shown in FIG. 2. FIG. 4 is a block diagram showing a control relationship between major components of a robot cleaner. FIG. 5 is a block diagram showing a control relationship between major components of a mobile terminal.

Referring to FIGS. 1(a) and 1(b), the robot cleaning system includes a robot cleaner 1 to remove dirt in a cleaning zone, and a mobile terminal 100 to acquire an image of the robot cleaner 1 and a surrounding area of the robot cleaner 1. FIG. 1(a) shows that a user is capturing an image of the robot cleaner 1 and dirt around the robot cleaner 1 using the mobile terminal 100, and FIG. 1(b) shows the captured image.

There are already known various simultaneous localization and mapping (SLAM) methods of enabling the robot cleaner 1 to sense a position and attitude thereof. For example, the robot cleaner 1 may include an obstacle sensing unit (53, see FIG. 4) that senses an obstacle situation in a cleaning zone, and may generate a map of the cleaning zone based on the obstacle situation around the robot cleaner 1 sensed by the obstacle sensing unit 53. The obstacle sensing unit 53 may include an ultrasonic sensor, an infrared sensor, a laser sensor, and/or a camera. For example, the robot cleaner 1 may include a laser light source to emit laser light having a prescribed pattern to a cleaning zone, and the obstacle sensing unit 53 including a camera may capture an image of the cleaning zone to which laser light is emitted. In this case, the robot cleaner 1 may extract a laser optical pattern from the image captured by the camera, and generate a map of the cleaning zone containing an obstacle situation in the cleaning zone based on variation of a position, shape, attitude and the like of the pattern extracted from the image.

While the above-described method may serve to generate a map of a cleaning zone around the robot cleaner 1 or to grasp an obstacle situation in the cleaning zone, it has no ability to grasp a positional relationship between a user and the robot cleaner 1 and, consequently, has a limit to provide service for intuitive control of the robot cleaner 1 from user's point of view. Accordingly, it may be convenient to intuitively control the robot cleaner 1 via an image acquired by the mobile terminal 100 (hereinafter referred to as an "acquired image"). However, to this end, it is necessary to acquire position of the robot cleaner 1 on the basis of the mobile terminal 100.

Referring to FIGS. 2 to 4, the robot cleaner 1 may include a main body 10 defining an external appearance of the robot cleaner 1, a suction unit 70 mounted in the main body 10 to suction dust in a cleaning zone, right and left wheels 61a and 62a for movement of the main body 10, and a first controller 52 to control general operations of the robot cleaner 1.

As the right wheel 61a and the left wheel 62a are rotated, the main body 10 is moved to a zone to be cleaned (hereinafter referred to as a "cleaning zone") and suction of dust and other dirt in the cleaning zone is performed by the suction unit 70.

The suction unit 70 may include a suction fan 72 mounted in the main body 10 to generate suction force and a suction opening 71 through which an air stream generated by rotation of the suction fan 72 is suctioned. In addition, the suction unit 70 may further include a filter (not shown) to collect dirt from the air stream suctioned through the suction opening 71 and a dirt receptacle (not shown) in which dirt collected by the filter is accumulated.

A traveling drive unit 60 may be provided to drive the right wheel 61a and the left wheel 62a. The traveling drive unit 60 may include a right wheel drive unit 61 to drive the right wheel 61a and a left wheel drive unit 62 to drive the left wheel 62a. In particular, as operation of the right wheel drive unit 61 and operation of the left wheel drive unit 62 are independently controlled by the first controller 52, forward movement, backward movement or turning of the main body 10 is accomplished. For example, when the right wheel 61a is rotated forward by the right wheel drive unit and the left wheel 62a is rotated reverse by the left wheel drive unit 62, the main body 10 is turned leftward or rightward. The first controller 52 may cause the main body 10 to perform translation motion as a combination of forward movement and turning by differently controlling revolutions per minute of the right wheel drive unit 61 and the left wheel drive unit 62. This movement of the main body 10 under control of the first controller 52 allows the main body 10 to avoid obstacles and turn. At least one auxiliary wheel 13 may be further provided to stably support the main body 10.

The robot cleaner 1 may include a first wireless communication unit 51 that performs wireless communication with the mobile terminal 100. The mobile terminal 100 may include a second wireless communication unit (120, see FIG. 5) that performs communication with the first wireless communication unit 51. Wireless communication between the first wireless communication unit 51 and the second wireless communication unit 120 may be accomplished via any of various methods, such as WiFi, Bluetooth, IR communication and the like.

The main body 10 may be provided with a pair of markers PS1 and PS2 spaced apart from each other by a given distance D. The markers PS1 and PS2 must be easily distinguishable from an image acquired by the mobile terminal 100. To this end, the markers PS1 and PS2 preferably have a specific pattern or color contrasting with a surrounding area.

Referring to FIG. 5, the mobile terminal 100 may include the second wireless communication unit 120, an image acquisition unit 130, a display unit 140, a microphone 150, an inertial sensor 160, and a second controller 110 to control all of the aforementioned components. The image acquisition unit 130 may include a camera to capture an image and process an image frame, such as a still image or a moving image, for example, captured by an image sensor of the camera. The processed image frame may be displayed on the display unit 140 or stored in a memory (not shown).

The display unit 140 serves to display an image acquired by the image acquisition unit 130. The display unit 140 may include a touch sensor (not shown) to sense touch applied to the display unit 140 so as to receive a control command in a touch manner. As such, when touch is applied to the display unit 140, the touch sensor may sense the touch and the second controller 110 may generate a control command corresponding to the sensed touch. Contents input in a touch manner may be letters or numerals, or may be instructions in a variety of modes or user programmable menu items, for example.

The display unit 140 may be interlayered or integrally formed with the touch sensor to construct a touchscreen. The touchscreen may function as a user input unit that provides an input interface between the mobile terminal 100 and the user and, simultaneously, may provide an output interface between the mobile terminal 100 and the user.

The microphone 150 serves to receive user voice and other sound. A plurality of microphones 150 may be installed to receive stereo sound.

The inertial sensor 160 serves to provide various navigation information including, for example, acceleration, velocity, direction and distance related to a moving object by detecting inertial force of motion. The inertial sensor 160 is configured to detect inertial force applied to an inertial body by acceleration. The inertial sensor 160 may include an acceleration sensor, a gravity sensor, a gyroscope sensor and the like.

A method of controlling a robot cleaner having two markers PS1 and PS2 spaced apart from each other by a known distance D includes acquiring an image, from a reference position, of the robot cleaner 1 and a surrounding area of the robot cleaner 1, identifying the two markers in the acquired image, defining a horizontal plane in space in which the two markers are actually located, based on positions of the two markers displayed on the acquired image and the known distance D between the two markers, determining the position of the robot cleaner 1 relative to the reference position based on a projected position of the two displayed markers on the horizontal plane, and controlling travel of the robot cleaner 1 based on the determined position of the robot cleaner 1 relative to the reference position.

Figure 6:
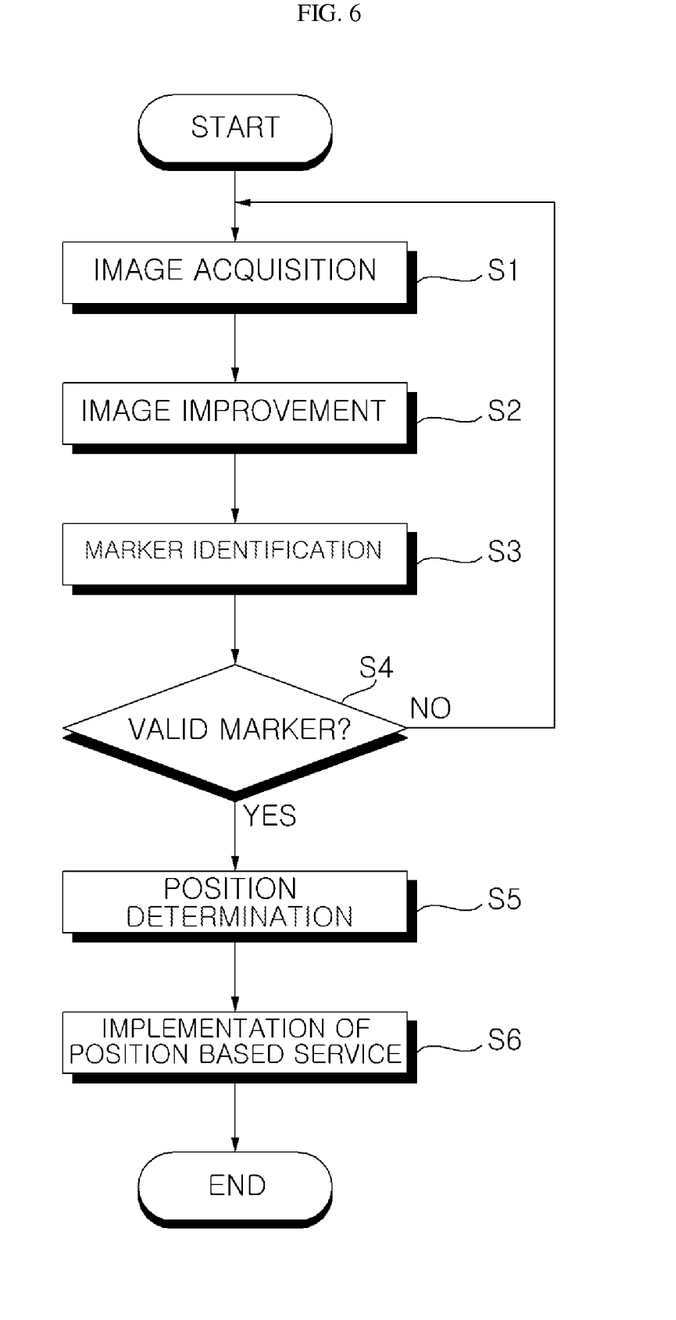
FIG. 6 is a flowchart showing a method of controlling a robot cleaner according to one embodiment of the present invention.

FIG. 6 is a flowchart showing a method of controlling a robot cleaner according to one embodiment of the present invention. Hereinafter, a method of controlling a robot cleaner according to one embodiment of the present invention will be described in more detail with reference to FIG. 6.

The user captures an image of the robot cleaner 1 and a surrounding area of the robot cleaner 1, from a reference position O, using the mobile terminal 100 (S1). Such image capture is performed using the image acquisition unit 130. The acquired image is not limited to a still image and may be a moving image. The image acquisition unit 130 may perform image improvement operations, such as brightness adjustment, noise removal, color correction, and the like, on the acquired image (S2).

The resulting improved image is displayed on a screen of the display unit 140, and the second controller 110 identifies (or extracts) markers PS1 and PS2 from the image displayed on the screen. More specifically, the second controller 110 may identify (or extract) features having shapes corresponding to a predetermined template. In this process, color of the markers PS1 and PS2 may also be considered (S3, marker identification step). For example, assuming that markers have a circular shape and are red, the second controller 110 may identify circular features from the image and then select red features among the circular features, thereby identifying the markers.

Then, it is determined whether or not valid markers are identified (S4). Upon determination that no valid markers are identified in the marker identification step S3, the control method will return to the image acquisition step S1. On the other hand, upon determination that valid markers are identified, the following position determination step S5 is performed.

In the position determination step S5, the second controller 110 determines (or calculates) position of the robot cleaner 1 relative to the reference position O based on the markers identified in step S3. Positions of the markers in the image, widths and heights of the markers, distances between the markers, and the like may be calculated. Based on the calculated results of the markers, a distance from the reference position O to the robot cleaner 1, a pitch angle and a yaw angle of the mobile terminal 100, and the like may be calculated. In particular, through use of the image acquired by the image acquisition unit 130, a horizontal plane in which the robot cleaner 1 is actually located or a horizontal plane in which the two markers are actually located may be defined based on a global coordinate system XYZ.

Thereafter, the second controller 110 may control travel of the robot cleaner 1 based on position acquired in the position determination step S5. In particular, the second controller 110 may provide various services based on a position or attitude of the robot cleaner 1 acquired in step S5 (S6).

Figure 7:
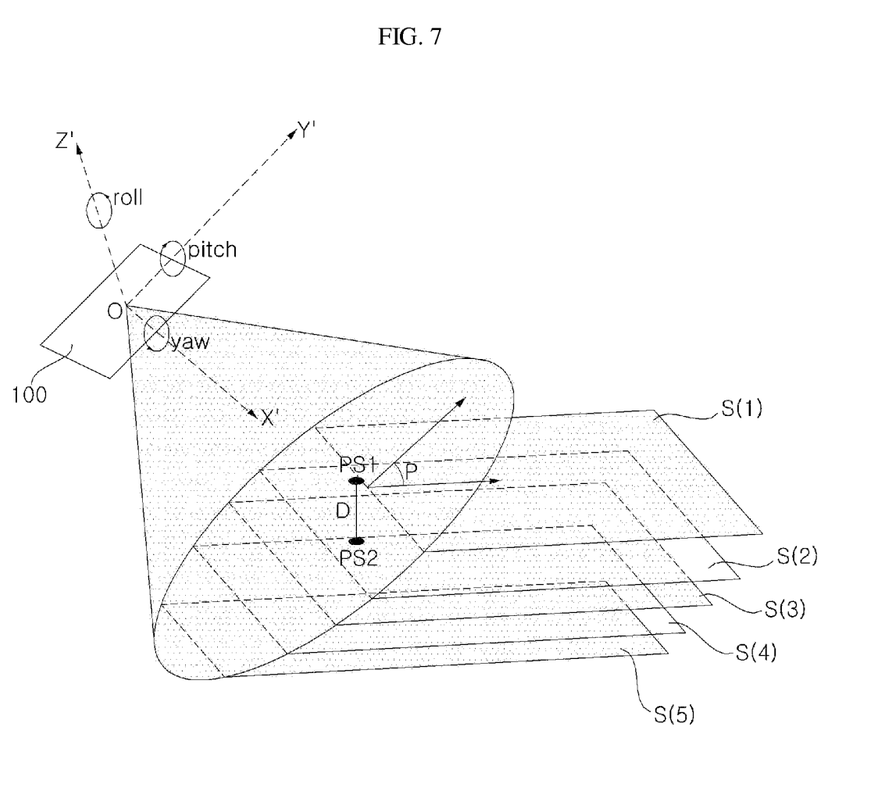
FIG. 7 is a view showing a horizontal plane in which markers are located among horizontal planes included in an image acquire range of a mobile terminal.
Figure 8:
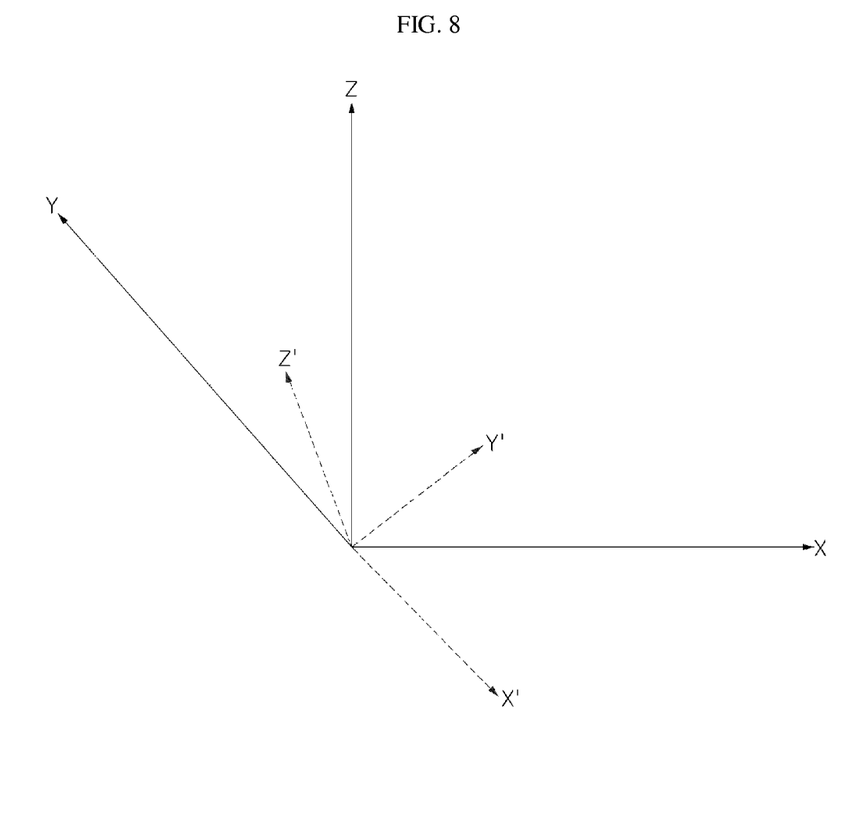
FIG. 8 is a view showing a local coordinate system X'Y'Z' and a global coordinate system XYZ centered on a mobile terminal as a center O.

FIG. 7 is a view showing a horizontal plane in which markers are located among horizontal planes included in an image acquire range of a mobile terminal. FIG. 8 is a view showing a local coordinate system X'Y'Z' and a global coordinate system XYZ centered on a mobile terminal as a center O.

First, in a local coordinate system (rotatable coordinate system) X'Y'Z' centered on the mobile terminal 100 as a center O, a direction of an optical axis of the image acquisition unit 130 or a direction of view of camera is defined as the −Z'-axis, X'-axis (e.g. short side of screen) and Y'-axis (e.g. long side of screen) are defined as designated. An angle about the Y'-axis defined as a pitch angle P. The local coordinate system X'Y'Z' is a rotatable coordinate system that is rotated according to pitch, yaw and/or roll of the mobile terminal 100.

A global coordinate system XYZ that is a fixed (i.e. orientations of axes are fixed) coordinate system centered on the mobile terminal 100 as a center O (reference position). In the global coordinate system XYZ, a gravity direction is defined as the −Z-axis, and XY defines a horizontal plane. As described above, the mobile terminal 100 may include an acceleration sensor, a gravity sensor, a gyroscope sensor and the like which constitute the inertial sensor 160, and may sense attitude variation thereof, such as pitch, yaw and roll, as well as an accurate gravity direction using these sensors. Accordingly, even if attitude of the mobile terminal 100 varies, transformation between the local coordinate system X'Y'Z' and the global coordinate system XYZ may be performed based on angles of pitch, yaw and roll sensed via the sensors. Thereby, coordinates or equations described based on the local coordinate system may also be expressed based on the global coordinate system.

Referring to FIGS. 7 and 8, to define a position of the robot cleaner 1 in the global coordinate system XYZ centered on a reference position O, first, it is necessary to determine a horizontal plane in space in which the robot cleaner 1 is actually located, based on an image acquired by the mobile terminal 100. As exemplarily shown in FIG. 7, while markers PS1 and PS2 actually have different depths (along the −Z'-axis) within a view field of the image acquisition unit 130 and are variable in position and shape in the image according to pitch, yaw and roll of the mobile terminal 100, the image acquired via the image acquisition unit 130 is a planar (2D) image and provides only 2D information. Therefore, to acquire position or attitude information of the markers in the global coordinate system XYZ based on positions of the markers PS1 and PS2 found from the acquired image, it is necessary to acquire a horizontal plane S(2) in which the markers PS1 and PS2 are actually located among horizontal planes S(1), S(2), S(3), S(4) and S(5), a common normal line of which is the Z-axis of the global coordinate system XYZ.

Figure 9:
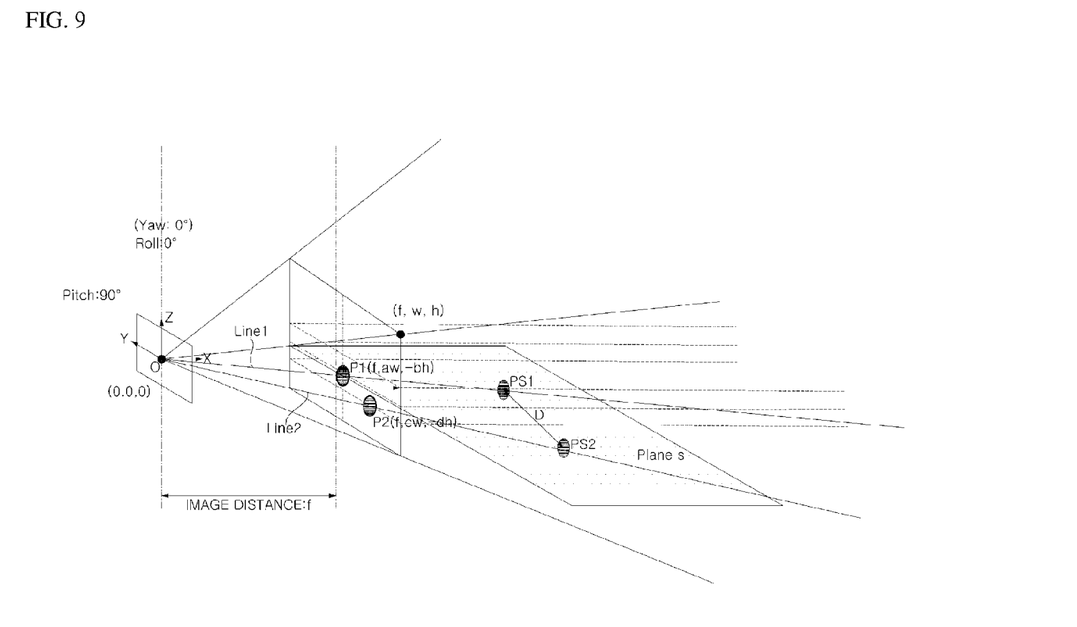
FIG. 9 is a reference view for explanation of a process of determining a horizontal plane in which a robot cleaner is located, based on an image acquired by a mobile terminal.

FIG. 9 is a reference view for explanation of a process of determining a horizontal plane in which a robot cleaner is located, based on an image acquired by a mobile terminal. Hereinafter, a process of determining a horizontal plane in space in which two markers are actually located, based on an image acquired by the image acquisition unit 130 will be described with reference to FIG. 9. In FIG. 9, a gravity direction is the −Z-axis, and a direction of an optical axis of the camera included in the image acquisition unit 130 coincides with the +X-axis for the convenience of the description. This coincides with a local coordinate system X'Y'Z' rotated by 90 degrees (pitch: 90 degrees) about the Y'-axis. The X-axis may be defined as a horizontal component of an optical axis of the image acquisition unit 130.

An image shown in FIG. 9 is acquired by the image acquisition unit 130, and an image distance f designates a distance from a reference position O to the acquired image within a view field of the camera. Assuming that the acquired image is an image captured by an image sensor of the camera, the image distance f corresponds to a focal distance of a lens because the image sensor is normally located at the focal distance from the lens.

Assuming that the acquired image is an image displayed on a screen of the display unit 140, as exemplarily shown in FIG. 9, the image distance may be understood from a symmetric relationship between the acquired image and an actual view to be captured in a triangular perspective view, a vanishing point of which is a reference position O. The image distance has a predetermined value according to specifications of the camera.

In any case as described above, the image distance f has a known value, and the following description is centered on the acquired image displayed on a screen of the display unit 140.

In FIG. 9, two markers arranged at the robot cleaner 1 in an actual space are designated by PS1 and PS2, and markers displayed on the acquired image are designated by P1 and P2 for distinction with the actual markers PS1 and PS2. In addition, coordinates of one corner of an upper limit of the acquired image are defined as (f, w, h), and the markers P1 and P2 are represented, based on the coordinates (f, w, h), by P1=(f, aw, −bh) and P2=(f, cw, −dh). Here, a, b, c and d have values between 0 and 1.

An equation for a first line Line 1 that passes the reference position O and the marker P1, an equation for a second line Line 2 that passes the reference position O and the marker P2, and an equation for an arbitrary horizontal plane having a normal line along the Z-axis are represented respectively as follows:

(Equation for the first Line)

$$\frac{x}{f} = \frac{y}{aw} = -\frac{z}{bh}$$  Equation 1

(Equation for the second Line)

$$\frac{x}{f} = \frac{y}{cw} = -\frac{z}{dh}$$  Equation 2

Equation 3 (Equation for the arbitrary horizontal plane having a normal line along the Z-axis)

$$Z = s$$

The markers PS1 and PS2 are points which are located on the first line Line 1 and the second line Line 2 respectively in the same single horizontal plane s. Thus, coordinates of the markers PS1 and PS2 may be represented as follows respectively.

$$PS1 = \left(-\frac{fs}{bh}, -\frac{asw}{bh}, s\right)$$  Equation 4

$$PS2 = \left(-\frac{fs}{dh}, -\frac{csw}{dh}, s\right)$$  Equation 5

Now, an equation for a horizontal plane in which the two points are located may be obtained by making a distance relation between the markers PS1 and PS2 and substituting an actual distance D between the two points into the distance relation.

$$PS1 = \left(-\frac{fs}{bh}, -\frac{asw}{bh}, s\right)$$  Equation 6

-continued $$D^2 = \left(\frac{fs}{bh} - \frac{fs}{dh}\right)^2 + \left(\frac{asw}{bh} - \frac{csw}{dh}\right)^2 \quad \text{Equation 7}$$

$$s = \pm \frac{D}{\sqrt{\left(\frac{1}{b} - \frac{1}{d}\right)^2\left(\frac{f}{h}\right)^2 + \left(\frac{a}{b} - \frac{c}{d}\right)^2\left(\frac{w}{h}\right)^2}} \quad \text{Equation 8}$$

In Equation 8, a positive root is an imaginary root that defines a horizontal plane intersecting the lines Line 1 and Line 2 along the −X-axis.

Through the above equations, the horizontal plane s of an actual space in which the markers PS1 and PS2 are located may be found. Then, attitude information and the like of the robot cleaner 1 may be acquired from position information of the markers PS1 and PS2 relative to the reference position O and a positional relationship between the two markers PS1 and PS2.

These calculations are performed by the second controller 110 of the mobile terminal 100 and the calculated results may be transmitted through the second wireless communication unit 120. The first wireless communication unit 51 of the robot cleaner 1 may receive the information transmitted through the second wireless communication unit 120, and the first controller 52 of the robot cleaner 1 may reconfigure a map based on a global coordinate system by combining a map on the basis of the robot cleaner 1 and the received information.

The reconfigured map may again be transmitted to the mobile terminal 100 via communication between the first wireless communication unit 51 and the second wireless communication unit 120, and the second controller 110 of the mobile terminal 100 may control travel of the robot cleaner 1 based on the global coordinate system based map configured as described above.

The second controller 110 enables intuitive control of the robot cleaner 1 by perceiving user touch applied to the acquired image that is displayed on the screen of the display unit 140. For example, when any point in the acquired image is selected via user touch motion, an equation for a straight line that interconnects the selected point and the reference position O may be obtained. By combining the equation for the straight line and the above-described equation for the horizontal plane s in which the two markers are located, coordinates of a point where the straight line meets the horizontal plane s, i.e. coordinates of the selected point projected onto the horizontal plane s may be calculated. Since the calculated coordinates of the point are based on a global coordinate system, various control modes to cause the robot cleaner 1 to move to the corresponding point or to bypass the corresponding point are possible. These control modes are very intuitive and convenient because they are based on touch motion applied to the image acquired by the image acquisition unit 130. Meanwhile, the touch motion is not limited to designating any one point, but may be performed in various ways, such as, for example, by designating an area enclosed by a line, by designating a travel path, or by designating a travel prevention line. Even when a line is designated by touch motion, coordinates of respective points of the line projected onto the horizontal plane s may be acquired because a line consists of points and, consequently, an area or travel path designated by the line drawn by these coordinates in the horizontal plane s may also be represented based on a global coordinate system.

In addition, the robot cleaner 1 may grasp an obstacle situation of a surrounding area via the obstacle sensing unit 53. The obstacle situation may be displayed over the acquired image displayed on the display unit 140 via inter-communication between the first wireless communication unit 51 and the second wireless communication unit 120. This may assist the user in more intuitively understanding the obstacle situation of the surrounding area of the robot cleaner 1. In addition, as the obstacle situation is displayed over the acquired image, detailed information related to obstacles may be additionally displayed on the screen.

In the above description, the horizontal plane s of an actual space in which the two markers PS1 and PS2 are located has been described as being defined based on coordinates of the two markers PS1 and PS2 arranged at the robot cleaner 1 in the acquired image (position information of the two markers PS1 and PS2 in the acquired image) and a predetermined image distance of the acquired image. In addition, it has been described that coordinates of touch points and lines on the acquired image projected onto the horizontal plane s may be acquired. In this case, the horizontal plane s in which the two markers PS1 and PS2 are located is parallel to a horizontal plane in which the robot cleaner 1 travels and, therefore, a figure drawn by the points and lines projected onto the horizontal plane s via touch input may be used to designate a travel path or a travel area of the robot cleaner 1. This will be described below in more detail with reference to FIG. 10.

Figure 10:
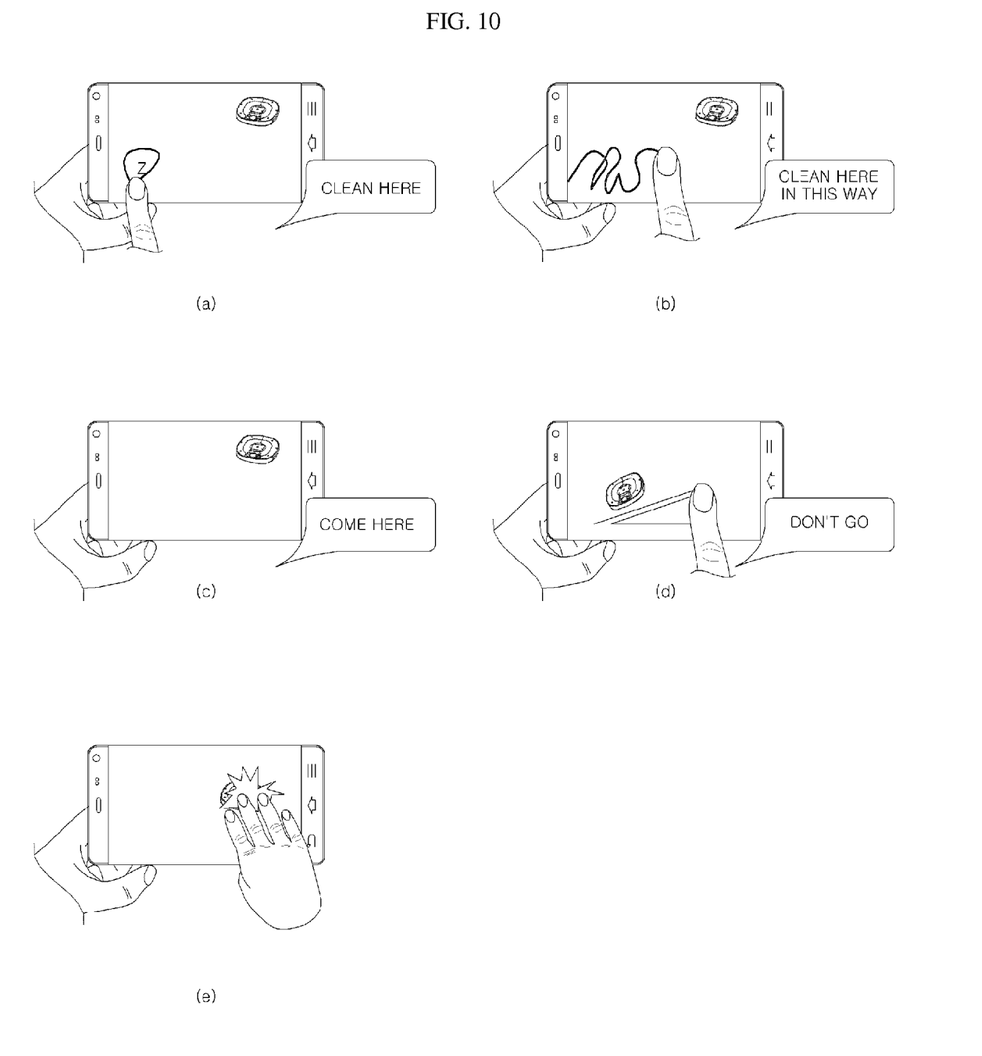
FIG. 10 is a view showing different examples of methods of controlling travel of a robot cleaner according to patterns displayed on a captured image via touch input.

FIG. 10 is a view showing different examples of methods of controlling travel of a robot cleaner according to patterns displayed on a captured image via touch input. Referring to FIG. 10(a), in a state in which the robot cleaner 1 is displayed on the screen of the display unit 140, the user may input a closed line pattern that designates a cleaning range by touching the screen. The second controller 110 may already know position of the robot cleaner 1 based on a global coordinate system from a horizontal plane related to the two markers PS1 and PS2 of the robot cleaner 1 and may also know coordinates of the pattern projected onto the horizontal plane. Accordingly, the second controller 110 may transmit a travel control command (or instruction) through the second wireless communication unit 120 to allow the robot cleaner 1 to travel along a range determined by the pattern. The traveling control command may be a travel map based on a pattern displayed on the acquired image and, differently, may be a control signal to control the drive unit 60 of the robot cleaner 1 in real time.

Meanwhile, the mobile terminal 1 may include a voice recognition module (not shown) that recognizes voice input through the microphone 150. In this case, the second controller 110 may control the robot cleaner 1 so as to travel along a path designated by a touch input pattern when a predetermined voice command, e.g., "Clean here" is input through the voice recognition module (cleaning zone designation).

Referring to FIG. 10(b), the user may input a pattern to designate a travel path of the robot cleaner 1 by touching the screen of the display unit 140 in a state in which the robot cleaner 1 is displayed on the screen. Similar to the above-described cleaning zone designation, the second controller 110 may control the robot cleaner 1 so as to travel according to the travel path designation pattern projected onto the horizontal plane s. When a predetermined voice command, e.g., "Clean here in this way" is input through the voice recognition module, the robot cleaner 1 may be controlled so as to travel along a path designated by the touch input pattern (travel path designation).

Referring to FIG. 10(c), the user may input a command to cause the robot cleaner 1 to come to the user in a state in which the robot cleaner 1 is displayed on the screen of the display unit 140. For example, the user may input a voice command, e.g., "Come here" through the microphone 150. The second controller 110 may instruct the robot cleaner 1 to move to the reference position O in response to the voice command.

Referring to FIG. 10(*d*), the user may input a prevention line that designates a travel prevention zone of the robot cleaner 1 by touching the screen of the display unit 140 in a state in which the robot cleaner 1 is displayed on the screen. The user may input a voice command, e.g., "Don't go", in addition to inputting the prevention line. The second controller 110 may control the robot cleaner 1 so as not to pass the prevention line projected to the horizontal plane s (travel prevention line setting).

Referring to FIG. 10(*e*), the user may stop travel of the robot cleaner 1 by applying touch having a predetermined pattern to the screen of the display unit 140 in a state in which the robot cleaner 1 is displayed on the screen. For example, when it is desired to rapidly stop the robot cleaner 1 during movement, the user may stop movement of the robot cleaner 1 by successively touching the screen of the display unit 140 twice.

As is apparent from the above description, a robot cleaning system and a method of controlling a robot cleaner according to the present invention have the effect of enabling intuitive and precise travel control of the robot cleaner via a screen displayed on a mobile terminal.

In addition, according to the present invention, position information of the robot cleaner relative to a specific reference position may be acquired, and this position information may be represented based on a global coordinate system. Accordingly, travel of the robot cleaner may be controlled based on the global coordinate system, which enables consistent control regardless of variation in the attitude of the mobile terminal.

In addition, according to the present invention, a horizontal plane required to control travel of the robot cleaner may be defined using markers arranged at the robot cleaner and a captured image thereof. In this case, owing to additional information, such as a gravity direction, attitude and the like, acquired by an inertial sensor included in the mobile terminal, easy transformation between a local coordinate system and a global coordinate system is possible. In particular, the number of markers required to determine attitude of the robot cleaner may be reduced to two, and shapes of the markers may be simplified. In this way, the robot cleaner may achieve an aesthetically improved appearance.

In addition, the present invention has the effect of ensuring easy setting of a travel prevention zone, a cleaning range or a travel path of the robot cleaner.

Although the present invention has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in components and/or arrangements of the subject combination arrangement within the scope of the disclosure, the drawings and the appended claims. In addition to variations and modifications in the components and/or arrangements, alternative uses will also be apparent to those skilled in the art.

What is claimed is:

1. A method of controlling a robot cleaner which travels on a horizontal floor and includes two markers spaced apart from each other by a known distance on a predetermined horizontal plane, the method comprising:

acquiring, by an image acquisition unit provided in a mobile terminal, an image, from a reference position, of the robot cleaner and a surrounding area of the robot cleaner;

identifying the two markers in the acquired image;

determining, by a controller provided in the mobile terminal, the horizontal plane based on positions of the two markers displayed on the acquired image and the known distance;

determining, by the controller, the position of the robot cleaner relative to the reference position, based on a projected position of the two displayed markers on the horizontal plane; and controlling, by the controller, travel of the robot cleaner based on the determined position of the robot cleaner relative to the reference position, via a wireless communication unit communicating with the robot cleaner, wherein the horizontal plane is determined, by the controller, as a horizontal plane in an actual space which intersects a first line and a second line, respectively connecting the two displayed markers and the reference position, when a distance between points where the first line and second line intersect the horizontal plane in the actual space is equal to the known distance.

2. The method according to claim 1, wherein, the position of the robot cleaner is determined, by the controller, based on a coordinate system centered on the reference position.

3. The method according to claim 1, wherein the controlling includes:

setting an area in the acquired image; and projecting the area onto the horizontal plane and instructing the robot cleaner to travel in the projected area.

4. The method according to claim 1, wherein the controlling includes:

setting a path in the acquired image; and projecting the path onto the horizontal plane and instructing the robot cleaner to travel along the path projected onto the horizontal plane.

5. The method according to claim 1, wherein the controlling includes instructing the robot cleaner to move toward the reference position from the determined position of the robot cleaner.

6. The method according to claim 1, wherein the controlling includes:

defining a line in the acquired image; and projecting the line onto the horizontal plane and instructing the robot cleaner not to pass the line projected onto the horizontal plane.

7. The method according to claim 1, further comprising:

stopping movement of the robot cleaner, by the controller, when a predetermined touch input is applied to a display unit displaying the acquired image.

8. The method according to claim 1, wherein the controlling includes receiving a voice command, by a microphone provided in the mobile terminal, to control travel of the robot cleaner.

9. A robot cleaning system comprising:

a robot cleaner having two markers spaced apart from each other by a known distance on a predetermined horizontal plane; and a mobile terminal comprising:

an image acquisition unit to acquire an image, from a reference position, of the robot cleaner and a surrounding area of the robot cleaner;

a wireless communication unit communicating with the robot cleaner; and a controller to:
  identify the two markers in the acquired image;
  determine the horizontal plane based on positions of the two markers displayed in the acquired image and the known distance;
  determine the position of the robot cleaner relative to the reference position where the image is acquired based on a projected position of the two displayed markers on the horizontal plane; and
  control travel of the robot cleaner based on the determined position of the robot cleaner via the wireless communication unit,
  wherein the controller determines the horizontal plane as a horizontal plane in an actual space which intersects a first line and a second line, respectively connecting the two displayed markers and the reference position, when a distance between points where the first line and second line intersect the horizontal plane in the actual space is equal to the known distance.

10. The system according to claim 9, wherein the mobile terminal further comprises:
  a touchscreen configured to display the acquired image, wherein the controller controls travel of the robot cleaner according to a touch input on the touchscreen.

11. The system according to claim 10, wherein the touch input on the touchscreen defines an area of the horizontal plane.

12. The system according to claim 10, wherein the touch input on the touchscreen defines a line on the horizontal plane.

* * * * *